(12) United States Patent
Hibbert

(10) Patent No.: US 8,805,599 B2
(45) Date of Patent: Aug. 12, 2014

(54) SYSTEM AND METHOD FOR PREVENTING UNAUTHORIZED DRIVING OF A LAND VEHICLE

(71) Applicant: Stephen Hibbert, Burlington (CA)

(72) Inventor: Stephen Hibbert, Burlington (CA)

(*) Notice: Subject to any disclaimer, the term of this patent is extended or adjusted under 35 U.S.C. 154(b) by 0 days.

(21) Appl. No.: 13/644,613

(22) Filed: Oct. 4, 2012

(65) Prior Publication Data

US 2013/0090784 A1   Apr. 11, 2013

Related U.S. Application Data

(60) Provisional application No. 61/544,868, filed on Oct. 7, 2011.

(51) Int. Cl.
 *G06F 17/00* (2006.01)
 *B60R 25/00* (2013.01)
(52) U.S. Cl.
 CPC ..................................... *B60R 25/00* (2013.01)
 USPC ............................................................ 701/2

(58) Field of Classification Search
 USPC ............................................................ 701/2
 See application file for complete search history.

(56) References Cited

U.S. PATENT DOCUMENTS

| 5,602,425 | A  | * | 2/1997 | Wilhelmi et al. ............ 307/10.1 |
| 6,589,134 | B2 |   | 7/2003 | Williams et al. |
| 2006/0206249 | A1 | * | 9/2006 | Fujioka ........................... 701/36 |
| 2007/0219686 | A1 | * | 9/2007 | Plante ............................. 701/35 |

* cited by examiner

*Primary Examiner* — Mary Cheung
*Assistant Examiner* — Anne Mazzara
(74) *Attorney, Agent, or Firm* — Patrick J. Hofbauer

(57) ABSTRACT

A credential-based vehicle interlock system for preventing unauthorized driving of a land vehicle even when the vehicle is left parked with its engine running. The subject system interacts, inter alia, with the existing sensors and electronic control module of the vehicle to prevent the transmission from shifting out of the "Park" gear, unless and until the credentials of the driver are validated against a database of credentials for authorized drivers. The system can be optionally configured to initiate and execute a controlled shutdown sequence of a moving land vehicle, upon receiving a wireless remote shutdown command.

22 Claims, 11 Drawing Sheets

SYSTEM AND METHOD FOR PREVENTING UNAUTHORIZED DRIVING OF A LAND VEHICLE

FIELD OF THE INVENTION

The present invention relates generally to the field of vehicle interlocking systems, and more particularly to an electronic processor controlled system for preventing the theft of land vehicles, which system is easily incorporated into the design of new vehicles, or may be readily retrofitted to existing vehicles without the need for extensive modifications to the vehicles existing hardware. The novel system disclosed is particularly adapted for use with fleet vehicles owned or operated by municipal or other governmental authorities, such as, for example, fire trucks, ambulances, busses, police cars and the like, where ready access to these vehicles by the public and the interchange of different authorized drivers makes them particularly susceptible to theft. This problem is particularly acute with such fleet vehicles that are often left running while the driver's seat is unoccupied. The prior art teaches numerous examples of vehicle ignition interlocks that aim to prevent an unauthorized driver from starting a vehicle's engine; absent from the prior art are systems that prevent an unauthorized driver from driving away a vehicle when the engine of such vehicle is already running.

SUMMARY OF THE INVENTION

The disclosed system of the invention is for use with land vehicles having a conventional automatic transmission that incorporates an interlock device to mechanically lock the driven wheels of the vehicle when the transmission is placed into the "Park" gear. The subject system interacts, inter alia, with the existing electronic control module (ECM) of the vehicle to prevent the automatic transmission from being taken out of the "Park" gear, unless and until a valid driver is selected from a preloaded data base, thereby significantly reducing the chance of theft. A system according to the present invention can also be optionally configured to remotely initiate a shutdown sequence for the vehicle when the automatic transmission is not in the "Park" gear. The system of the invention can be used with either of the two most common automatic transmission gear selection systems currently in use with land vehicles, being: i) push button electronic (i.e., Voith type); or, ii) mechanical selector handle type.

The present provides a system for preventing unauthorized driving of a land vehicle having an owner/operator, a driver, a service brake, a brake switch, an engine control module (ECM) configured to accept an input from the brake switch, a transmission having a park mode (i.e., a "Park" gear) and non-park modes (i.e., "neutral" or other "driving gears" in which the vehicle may be moved), and an ECM-controlled brake/shift interlock system configured to preclude shifting of the transmission out of its park mode until the service brake is applied. According to one aspect of the invention, the system comprises a credential, such as, for example, an electronically readable access/identity card, which credential is issued to the driver by the owner/operator of the vehicle to authorize the driver to drive the vehicle. The system further comprises a credential input device, such as, for example, an identity card reader, mounted on the vehicle, which input device is capable of accepting as input the credential issued to the driver. A microcomputer (CPU) is also mounted on the vehicle, with the input device being operatively connected thereto. The credential input device is capable of transmitting, and the microcomputer (CPU) is capable of receiving the credential. A credential database is stored in at least the microcomputer (CPU). The credential database contains credential data preloaded by the owner/operator of the land vehicle. The microcomputer (CPU) makes a determination, based on a comparison of the credential and said preloaded credential database, whether said driver is authorized or not authorized to drive the land vehicle. The microcomputer (CPU) is operatively connected to the ECM and is capable of operatively interacting with said ECM-controlled brake/shift interlock system to preclude shifting of the transmission out of its park mode when the microcomputer (CPU) determines that the driver is not authorized to drive the land vehicle.

According to another aspect of the present invention, the system further comprises a driver's seat occupancy sensor operatively connected to the microcomputer (CPU), wherein the microcomputer (CPU) is further capable of determining, based on an input from the driver's seat occupancy sensor fitted to the vehicle, whether a driver is, or is not, seated in a driver's seat, and the microcomputer (CPU) is further configured to operatively interact with the ECM-controlled brake/shift interlock system to preclude shifting of the transmission out of its park mode when said microcomputer (CPU) determines that a driver is not seated in the driver's seat.

According to another aspect of the present invention, the microcomputer (CPU) is configured to operatively interact with said ECM-controlled brake/shift interlock system by controlling the input from the brake switch to the ECM.

According to yet another aspect of the present invention, the system further comprises a vehicle "door open" sensor and an ECM-controlled shutdown system, wherein said ECM is capable of detecting, based on an input from the vehicle "door open" sensor, whether a vehicle's door is open while the vehicle is in motion, and wherein, upon detecting that a door of the vehicle is open while the vehicle is in motion, said ECM is configured to automatically initiate, independent of any action of the driver, a controlled vehicle shutdown and braking sequence to slow down and to bring the vehicle to a stop.

According to a still further aspect of the present invention, the system further comprises a wireless reception system fitted on the vehicle, with the wireless reception system being capable of receiving a remote shutdown command and forwarding the remote shutdown command to the microcomputer (CPU) mounted on the vehicle, wherein, upon receiving such a remote shutdown command, the microcomputer (CPU) is configured to operatively interact with the ECM-controlled shutdown system, by controlling the input from the vehicle "door open" sensor to the ECM, so as to initiate, independent of any action of the driver, a controlled vehicle shutdown and braking sequence to slow down and to bring the vehicle to a stop.

According to another aspect of the present invention, there is provided a method for preventing an unauthorized driver from operating a land vehicle having one or more authorized drivers, a service brake, a brake switch, an engine control module (ECM) configured to accept an input from the brake switch, a transmission having a park mode and non-park modes, and an ECM-controlled brake/shift interlock system configured to preclude shifting of the transmission out of its park mode until the service brake is applied. The subject method comprises the steps of: issuing a credential to one or more authorized drivers; fitting the vehicle with a microcomputer (CPU) operatively connected with the vehicle's ECM; fitting the vehicle with a credential input device being capable of accepting as an input the aforesaid credential from said one or more drivers; operatively connecting the microcomputer (CPU) and the credential input device with each other, with the credential input device being capable of transmitting, and the microcomputer (CPU) being capable of receiving, the transmitted credential; preloading credential data for the one or more authorized drivers into a credential database stored on said microcomputer (CPU); with each driver requesting driving of the vehicle by presenting his/her respective credential to the credential input device, with the microcomputer (CPU) making a determination, based on a comparison of the credential and the preloaded credential database, whether said driver is one of the one or more drivers authorized to drive said land vehicle; and with the microcomputer (CPU) operatively interacting with the ECM-controlled brake/shift interlock system to preclude shifting of the transmission out of its park mode when said microcomputer (CPU) determines that the driver presenting the credential to the credential input device is not authorized to drive the land vehicle.

These and other aspects of the present invention will be more fully understood and appreciated from a full reading of this specification and claims.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example, only. It is expressly understood, however, that the drawings are for the purpose of illustration and description only, and are not intended as a definition of the limits of the invention. In the accompanying drawings.

KEY PARTS LIST

Figure 1:
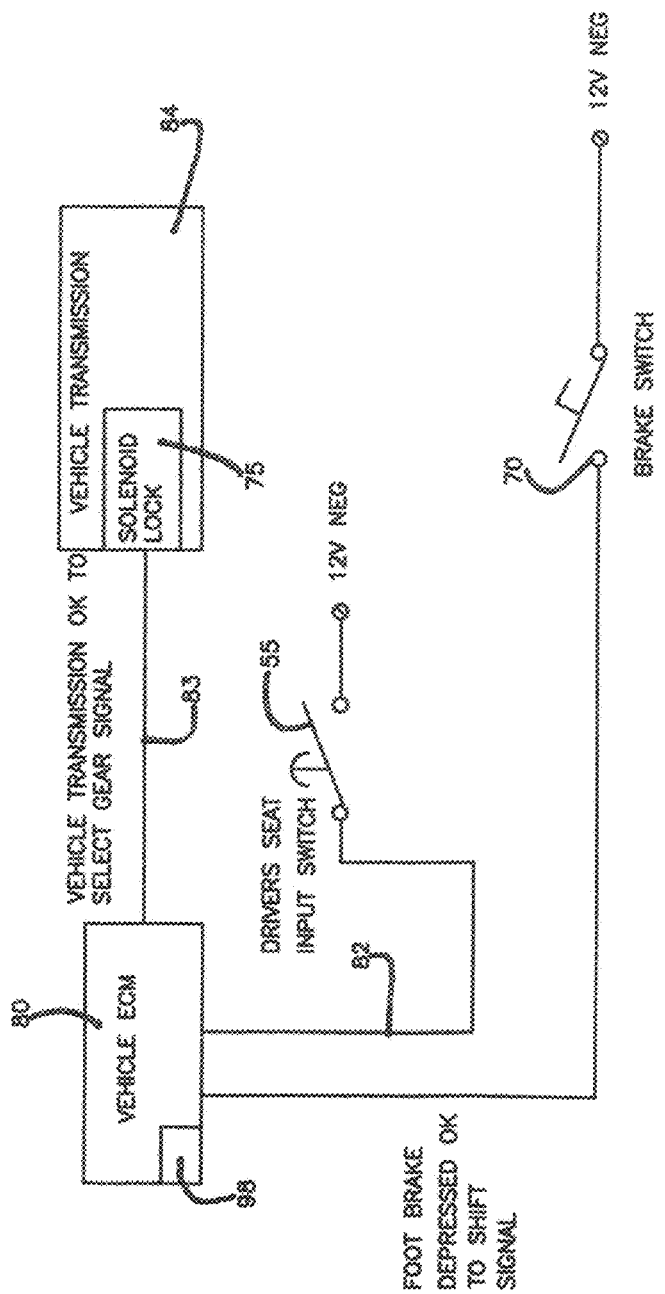
FIG. 1 is a schematic drawing of a vehicle interlock system as used in land vehicles according to the prior art.

20—microcomputer (CPU)—May be based upon, for example, a Cirrus™ CR10 Series controller, available from Ionodes, Inc., Laval, Quebec, H7L 4S3, Canada.

30—credential issued by vehicle owner/operator to authorize drivers. May be, for example, a RF programmable proximity identity card, such as an HID™ ISOProx™ II proximity access card, available from HID Corporation, Irvine, Calif., USA 92618-1905.

32—card reader. May be, for example, a RF programmable proximity access card reader, such as an HID™ MiniProx™ proximity card reader, available from HID Corporation, Irvine, Calif., USA 92618-1905.

34—access controller. May be, for example, a Keyscan Model #CA150 controller manufactured by Keyscan Inc. of Whitby, Ontario, Canada L1N 6A6. The access controller optionally stores a redundant database of valid driver cards and acts to translate the credential stored on the access/identity card (30) and read by the card reader (32) into a format processable by the CPU (20).

52—integrated relay connected to the driver's seat switch.

54—integrated relay connected to the door switch.

55—driver's seat switch—can typically use existing vehicle switch.

56—integrated relay connected to the brake switch.

57—interlock relay.

60—door switch—can typically use existing vehicle switch.

80—vehicle electronic control module ("ECM"); This is standard equipment on all modern land vehicles and is the main computer module that electronically monitors and controls all major functions and systems of the land vehicle, including, without limitation, the ignition system, fuel supply system, and activation and deactivation of the solenoid lock (75) found in all modern automatic vehicle transmissions (84), with control over the latter function being carried out through the sending of activation signals to the solenoid lock 75 via connection 83.

Figure 2:
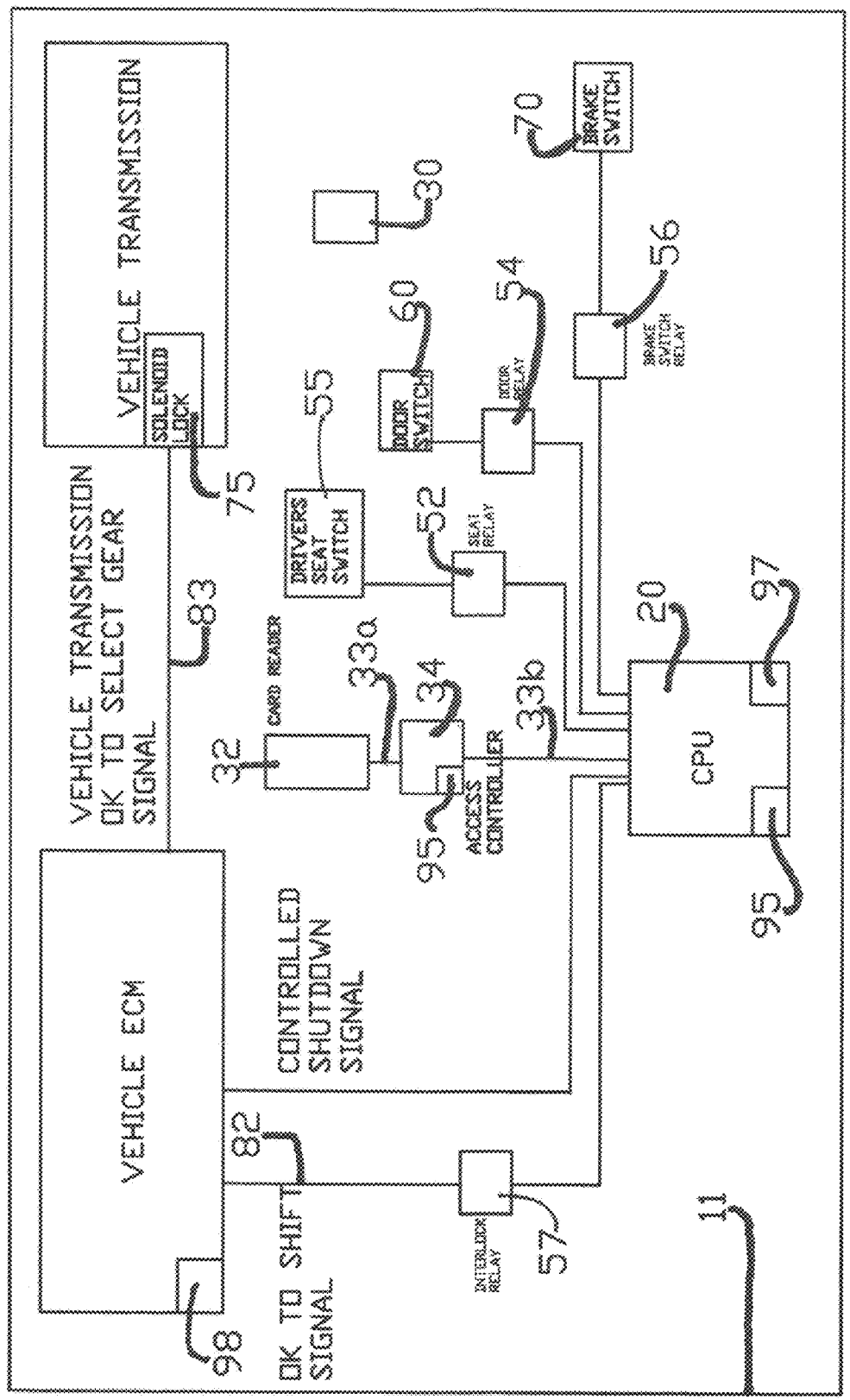
FIG. 2 is a schematic drawing of a system for use in land vehicles according to the present invention.
Figure 3:
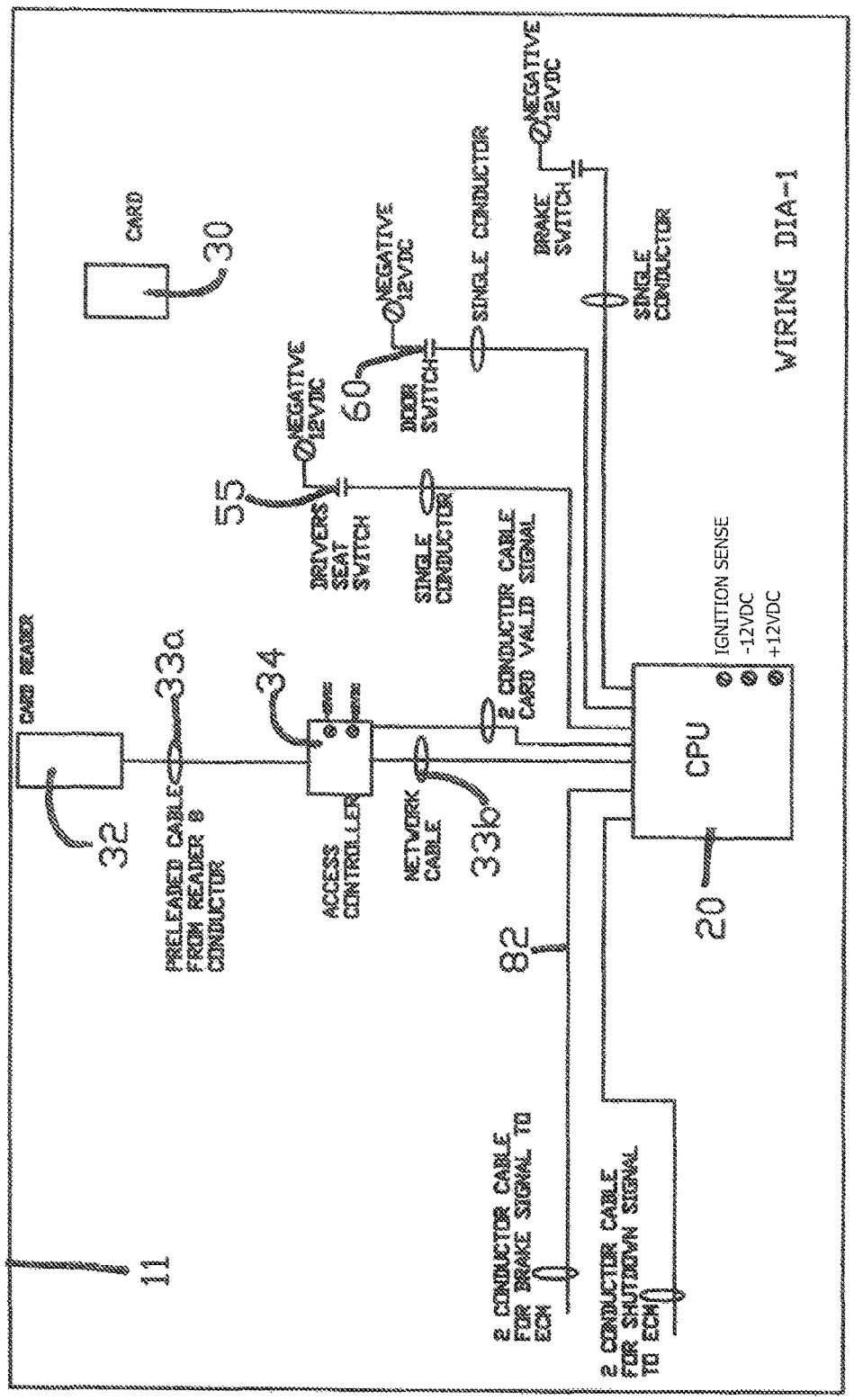
FIG. 3 is a wiring diagram of the system of FIG. 2.
Figure 4:
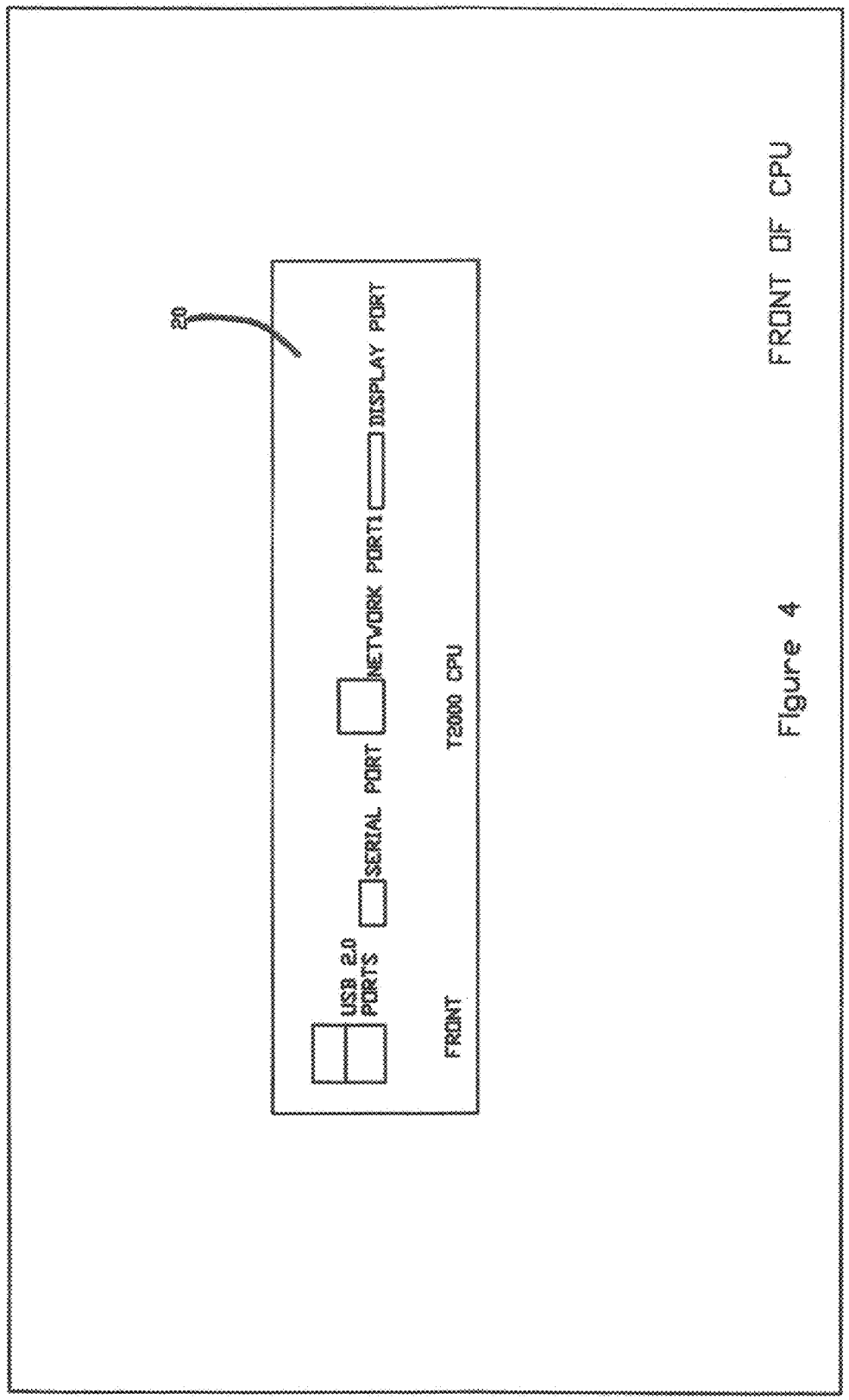
FIG. 4 is a front elevational view of the microcomputer (CPU) of FIG. 3.
Figure 5:
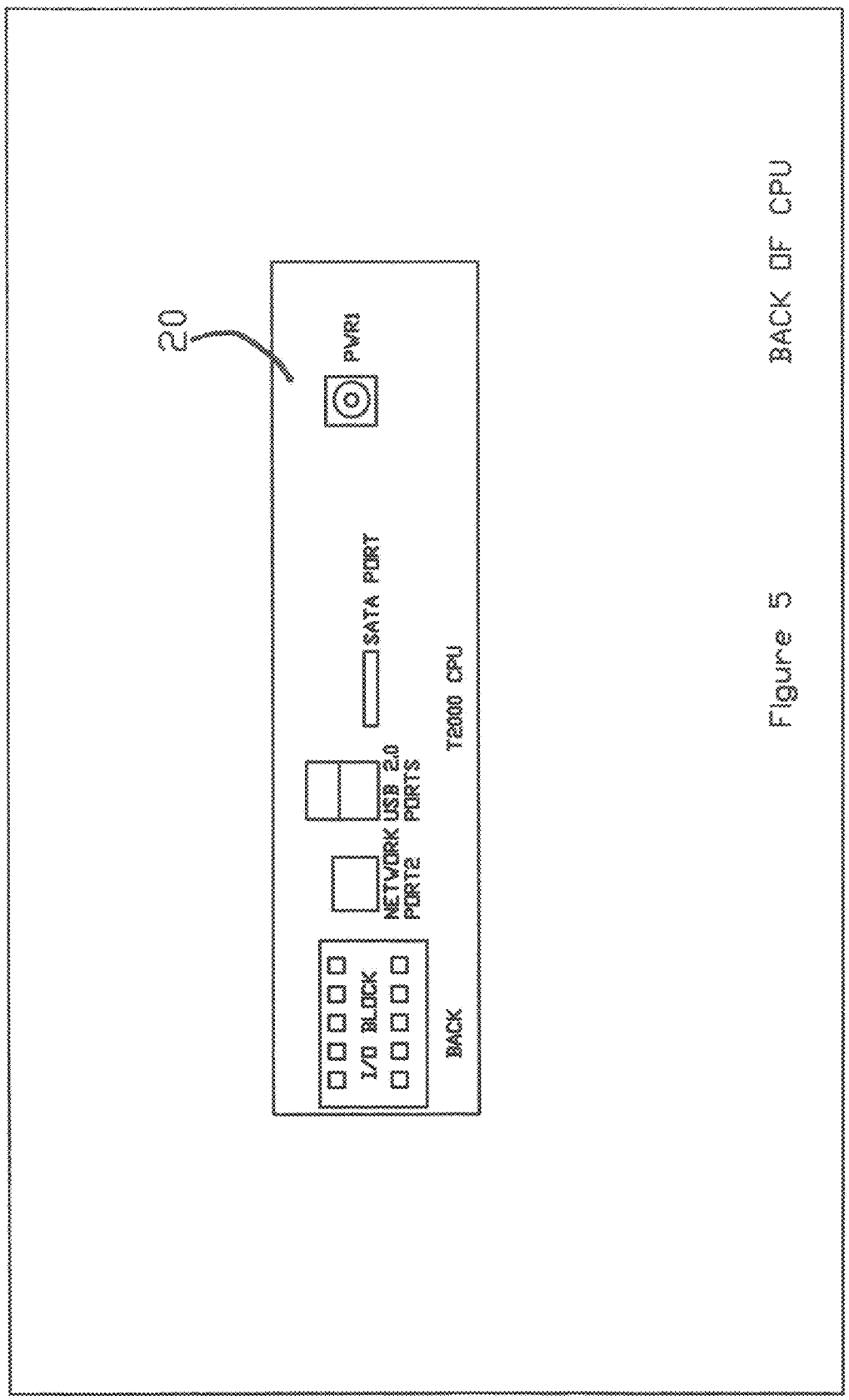
FIG. 5 is a rear elevational view of the CPU of FIG. 4.

The applicant's system is interposed between the ECM (80), the brake switch 70 and the driver's seat switch (55) so as to provide for basic utility of the present invention as described herein. Added functionality is optionally available through the interconnection of the vehicle's door switch (60) to the ECM (80) through the intervening agency of the applicant's system (11), as shown in FIGS. 2 though 10, and as described more fully herein.

DESCRIPTION OF THE INVENTION

The microcomputer (CPU) (20) is installed in the land vehicle (not shown) and is preloaded with a database (95) of authorized users, e.g., drivers trained in certain types of land vehicles, 40 foot bus, fire truck, ambulance and so on; in alternative embodiments, a redundant backup copy of the database (95) may additionally be stored on the access controller (34) for use in the event that the database on the microcomputer (CPU) becomes corrupted or otherwise unreadable. The microcomputer (CPU) may also preferably be programmed to store an event log (97) of driver validation attempts and the outcomes of such attempts, which event log (97) may be accompanied by linked video data files taken from cameras located on the land vehicle in proximity to the card reader 32, thereby to further provide positive visual identification of a particular driver using the system of the invention.

The card reader (32) may be of a contact or non-contact type that will read standard access credentials (30) (e.g., an access/identity cards) and that are commonly used to control, for example, access by authorized personnel to commercial or public buildings.

The card reader (32) may be installed inside the land vehicle adjacent in front of, or otherwise adjacent to the driver's seat. It may be connected via a cable 33a to the access controller (34), and from there by connector 33b to a network port on the CPU (20). This allows the information stored on the credential (30) to be read and converted into computer language readable by the CPU (20).

Figure 6:
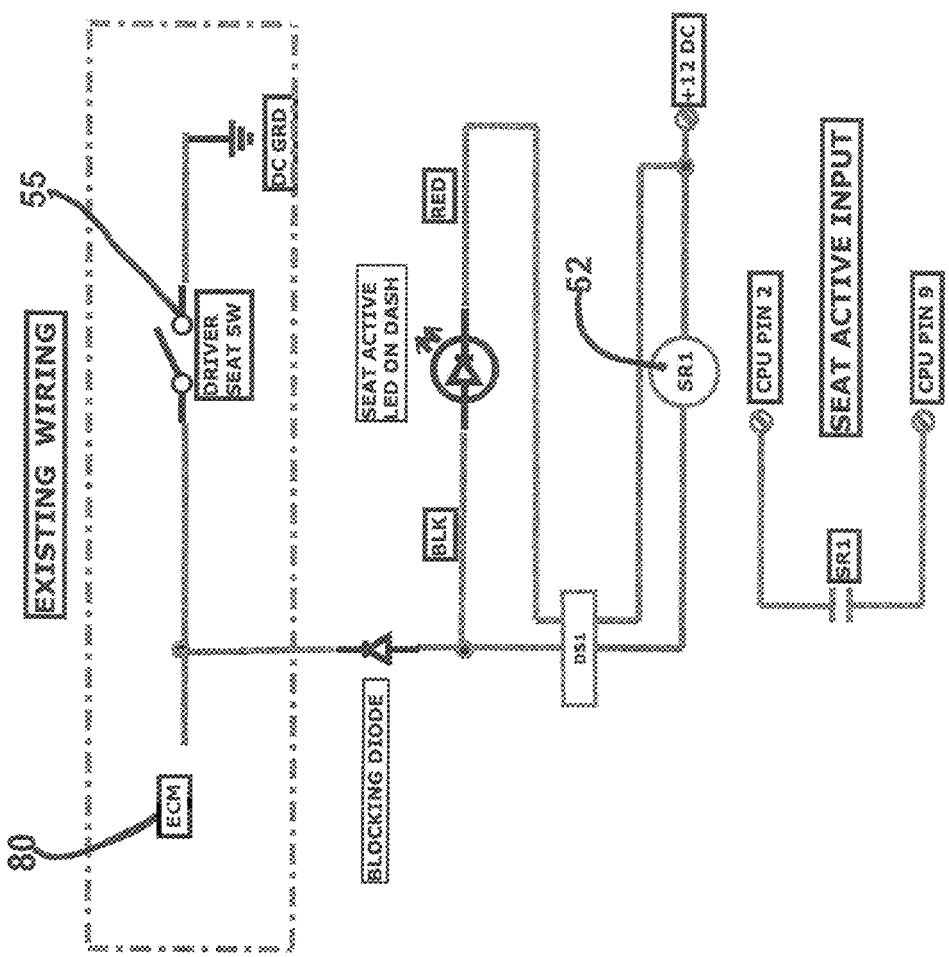
FIG. 6 is a detail of the seat input wiring of the system of FIG. 2.

The existing driver's seat switch (55) is connected to and provides a digital input to the CPU (20), via an IC integrated relay component (52) located within a control box close to the CPU (20), as best seen in FIG. 6. The input power to the relay component (52) is −12 volts DC.

Figure 7:
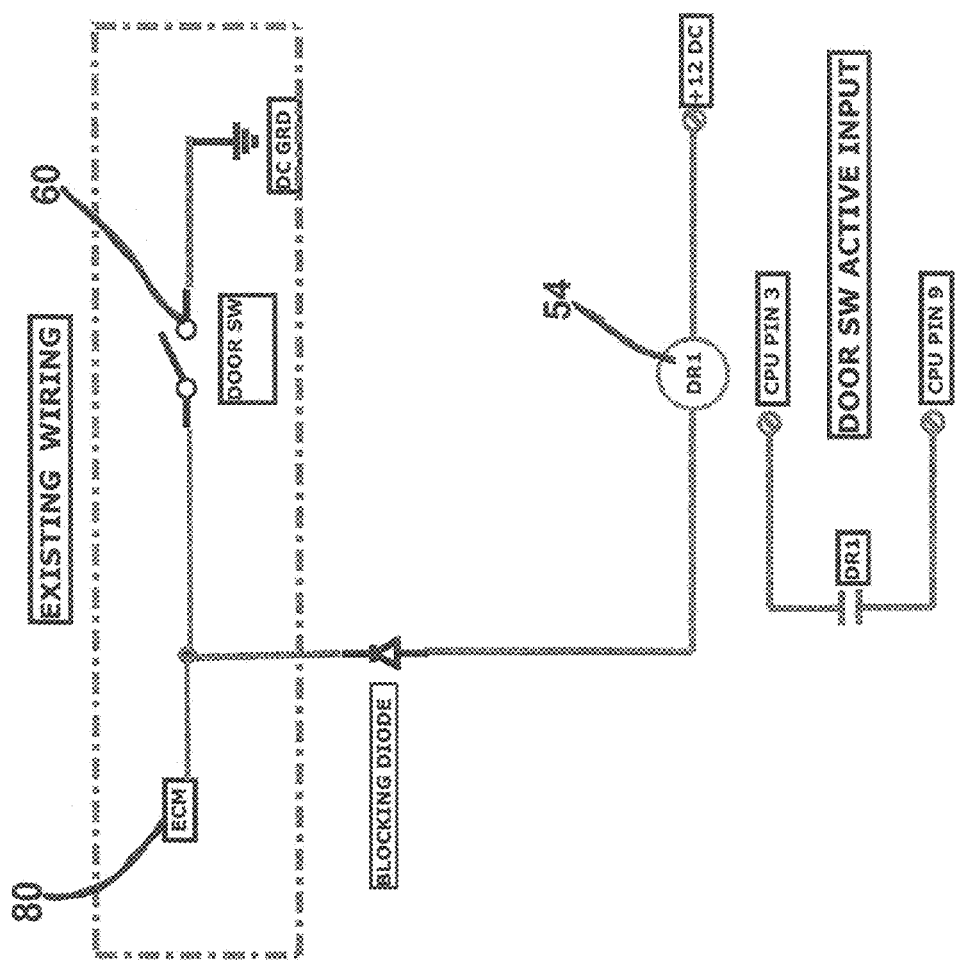
FIG. 7 is a detail of the door input wiring of the system of FIG. 2.

The existing driver's door switch (60) is connected to and provides a digital input to the CPU (20), via an IC integrated relay component (54) located within the control box close to CPU (20), as best seen in FIG. 7. The input power to the relay component (54) is −12 volts DC.

Figure 8:
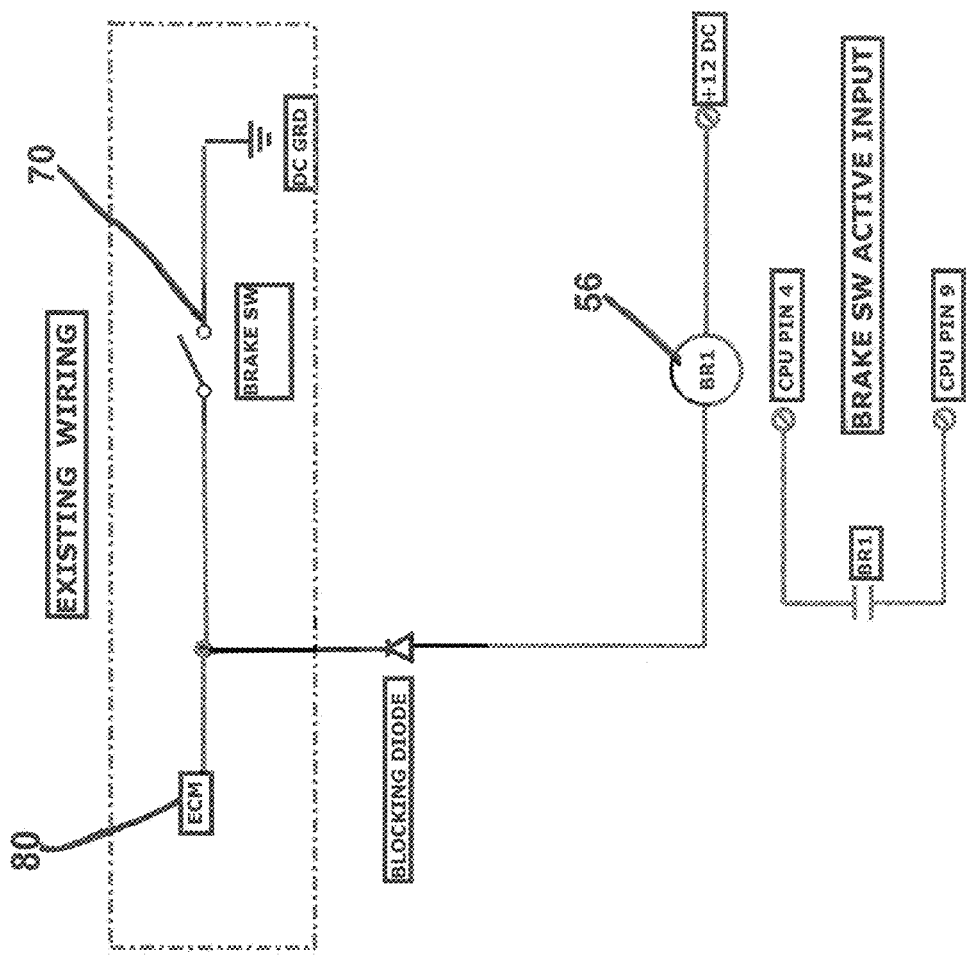
FIG. 8 is a detail of the brake input wiring of the system of FIG. 2.
Figure 9:
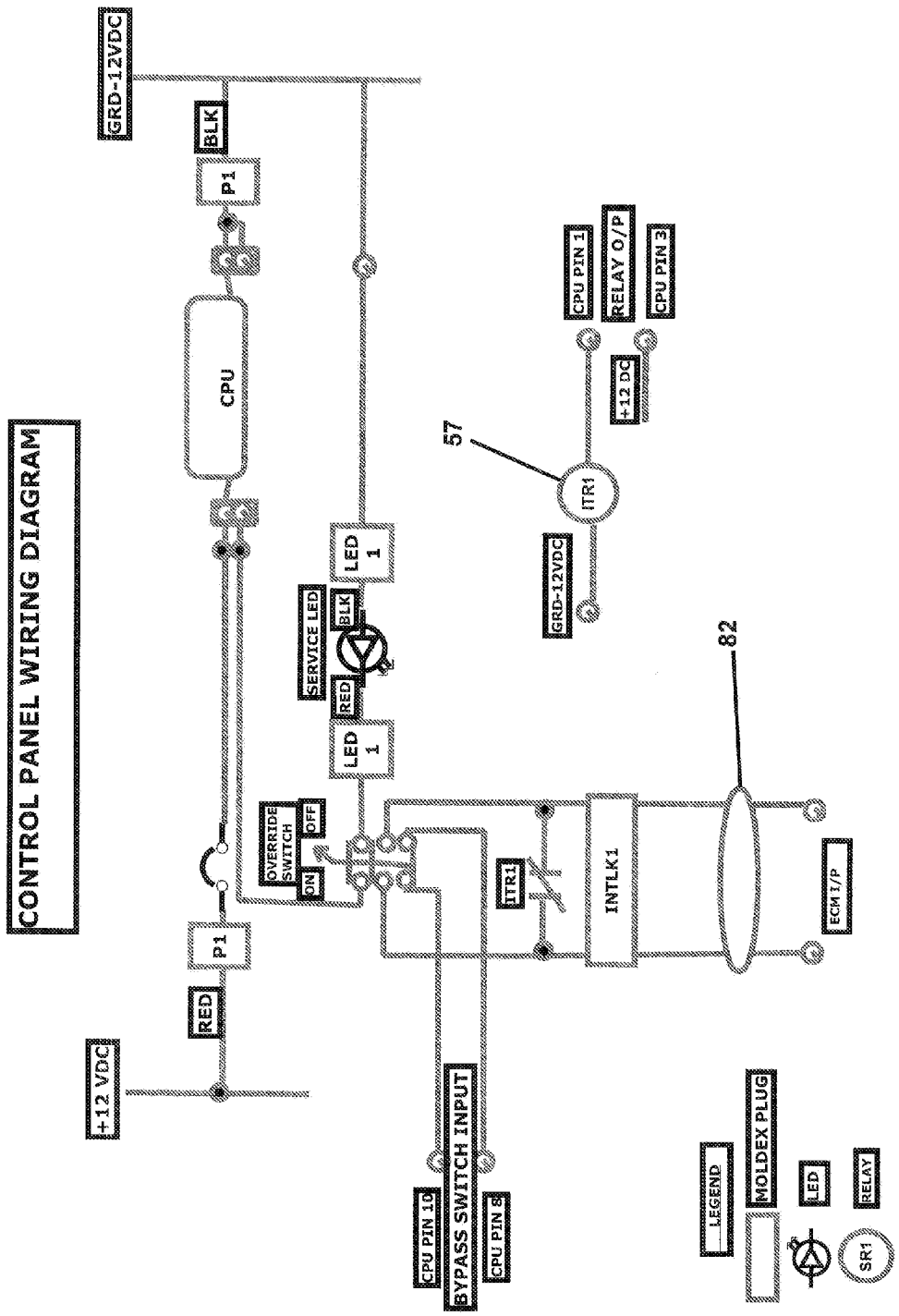
FIG. 9 is a wiring diagram of the control panel of the system of FIG. 2.
Figure 10:
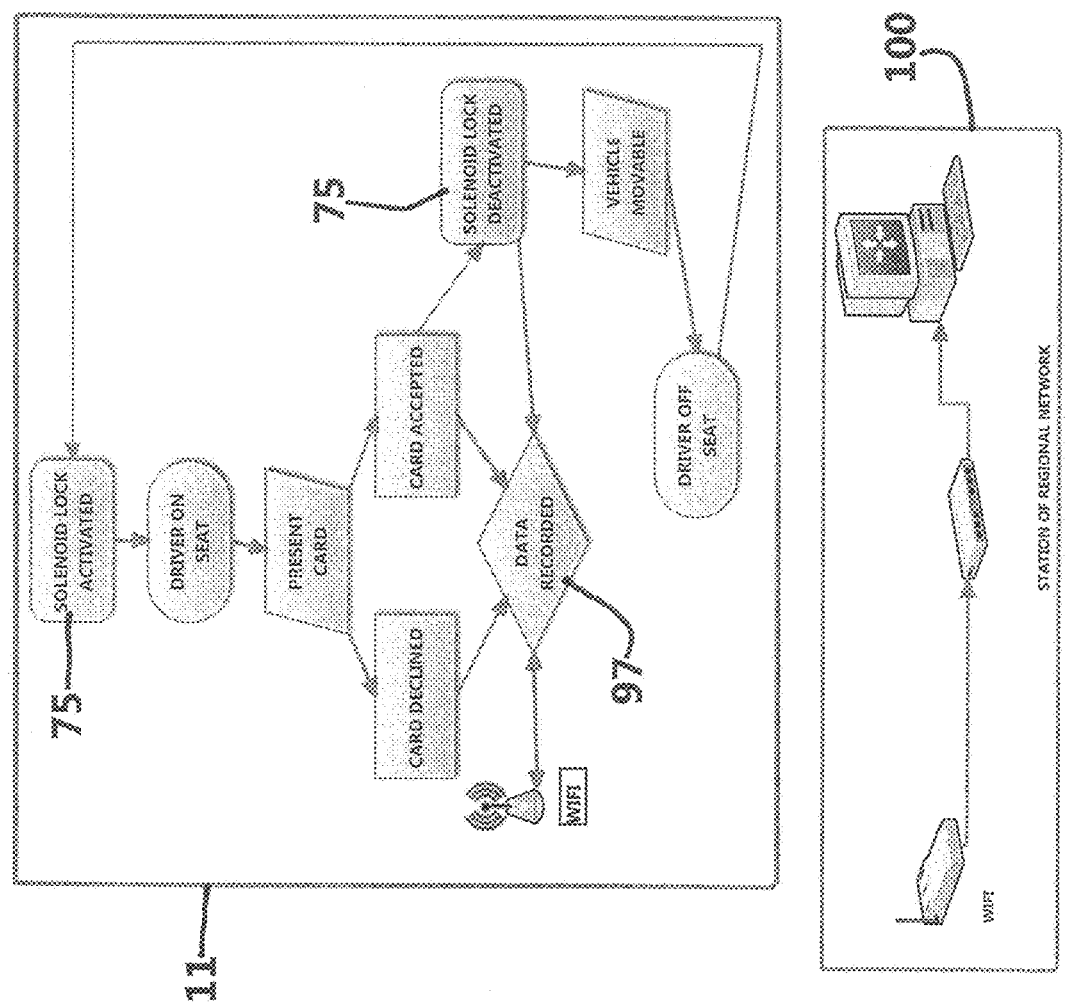
FIG. 10 is a flow chart showing the control flow of actions by the system illustrated in FIGS. 2-9.
Figure 11:
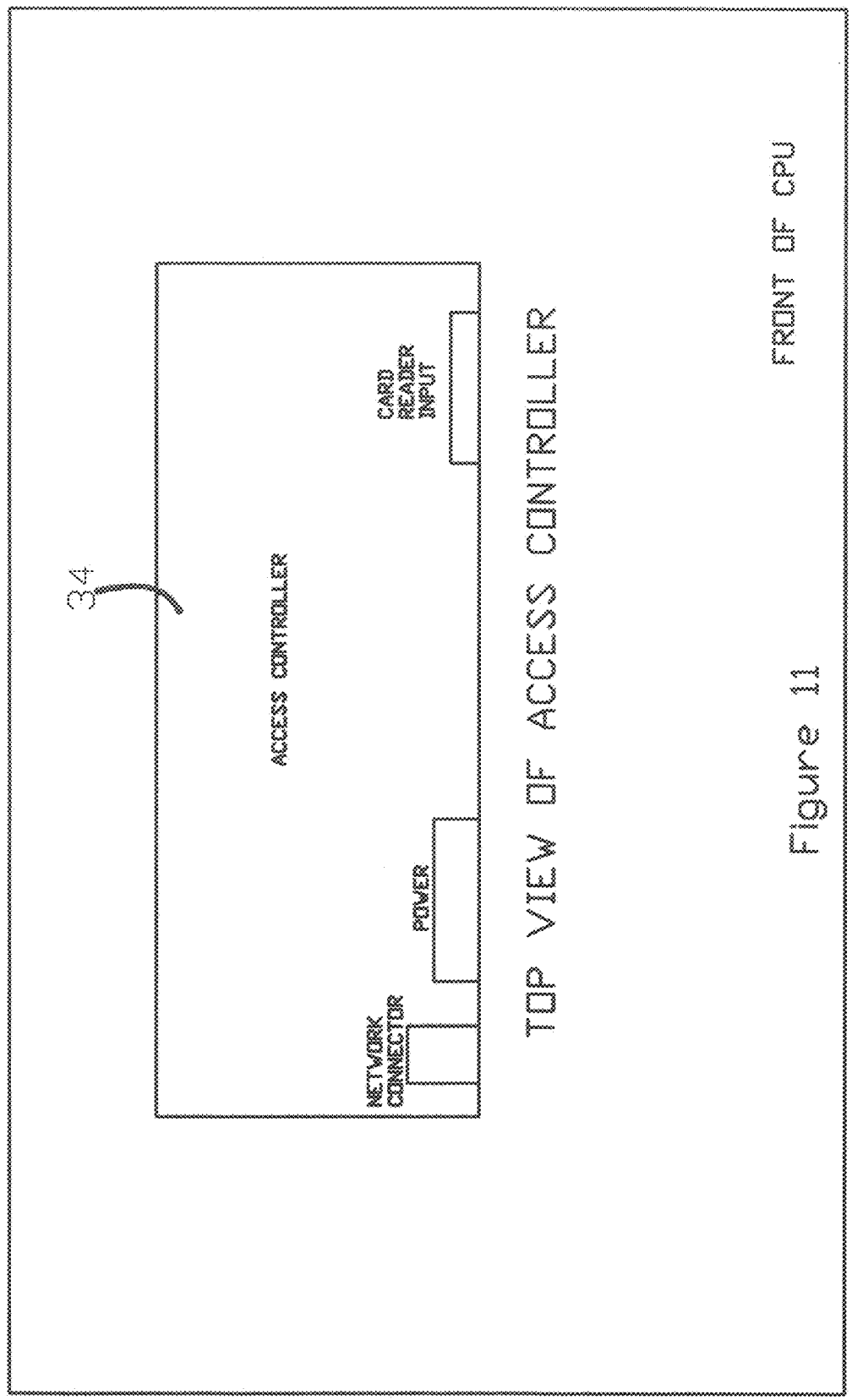
FIG. 11 is a top elevation of an access controller that may be used in the system of FIGS. 2-10.

The existing brake switch (70) is connected to and provides a digital input to the microcomputer (CPU) (20), via an IC integrated relay component (56) located within the control box close to microcomputer (CPU) (20), as best seen in FIG. 8. The input power to the relay component (56) is −12 volts DC.

In operation, and having regard to FIGS. 2 through 10, a driver sits on the driver's seat (not shown), which closes the driver's seat input switch (55), to indicate that the driver is in the seat and to activate the seatbelt caution light (or some other warning message or device relating to seatbelt being unfastened, if seatbelt is not fastened), thereby allowing the engine of the land vehicle to be started (as is also the case with the prior art system shown in FIG. 1). The system uses the seat switch (55) to indicate that the driver is on the driver's seat, and to allow the brake pedal circuit to activate its input. The driver then presents his/her credential (30) (i.e., access/identity card etc.), while simultaneously depressing the brake pedal, which closes brake switch 70. The database (95) (stored in the CPU (20), with an optional backup copy stored in the access controller (34)) is scanned to verify that the information stored on the credential (30) (e.g., access/identity card) and presented to the credential input device (32) (e.g, the card reader) is valid. If determined by comparison with the database (95) to be valid, and with the brake pedal switch 70 still in its closed configuration, an activation signal is sent from the microcomputer (CPU) (20) to the vehicle ECM (80) through connector cable 82, via interlock relay (57)—see FIG. 9. The ECM (80) sends an unlocking command signal to the solenoid lock 75 within the automatic transmission 84, which causes the solenoid lock 75 to move from its previously locked state to its unlocked state. Thus, with such an activation signal having been sent to the ECM (80), the driver is now able to move the gear selector of the land vehicle transmission from the "Park" gear to a driving gear. If a credential (e.g. access/identity card) (30) is not validated by comparison with the database (95), no such unlocking signal is sent to the ECM (80), with the result that the solenoid lock 75 remains in its locked state. The appropriate credential data entries read by the reader (32) are preferably recorded to the event log (97) of the CPU (20), and may optionally be sent by conventional Wi-FI means (90) from the land vehicle to a base station (100) of a regional network. In the event of non-validation, the solenoid lock (75) of the automatic transmission (84) will stay activated (i.e. lockingly engaged so as to prevent rotation of the drive wheels of the land vehicle), thereby holding the automatic transmission (84) in the "Park" gear, such that the vehicle cannot be moved or driven. In this manner, only drivers with a credential (20) validated for a particular land vehicle will be able to drive or move that land vehicle. Accordingly, even where a land vehicle is left idling, which is often the case with fleet vehicles, particularly diesel fleet vehicles operating in colder clients, its ability to be stolen or taken for a joy ride by unauthorized personnel is greatly reduced.

If the driver leaves his/her seat, at any time before selecting a drive gear, the CPU (20) sends a signal to the ECM (80) to reactivate the solenoid lock (75).

It will be appreciated that the present invention can be incorporated into new land vehicles or retrofitted to existing land vehicles having an automatic transmission and conventional ECM without extensive mechanical modifications to the mechanics or the electronics of the vehicle, including the prior art ECM. This is so, as existing land vehicles already have a brake switch (70) attached to their brake pedal, which brake switch (70) is wired and otherwise configured to send a control signal to the ECM telling it when the brakes of the vehicle are engaged, such that the automatic transmission may be moved from the "Park" gear to a driven gear. What the applicant's invention does, in a simple but elegant manner, is interrupt this pre-existing signal path/channel to the ECM, and impose a further condition on the sending of this control signal to the ECM, such condition being the presentation to the card reader (32) (or other input device, not shown) of a valid driver identification credential. The applicant's microcomputer (CPU) (20)(in conjunction with the access controller (34)), acts as the gatekeeper/controller in this regard, as serial or parallel stacking of conditions precedent for initiation and sending of the required control signal to the ECM over the pre-existing electrical connector (82) is made possible by the imposition of such conditions precedent on the ECM (80) by the microprocessor (CPU) (20) (in conjunction with the access controller (34)), acting on inputs from in the brake switch (70), the door switch (60), the card reader (32), and the driver's seat switch (55).

Controlled Shutdown

As an optional feature, the CPU (20) may also be programmed to process a shutdown command as follows. Upon the microcomputer (CPU) (20) receiving the shutdown command via, for example, GMS radio or Wi-Fi, the microcomputer (CPU) (20) will command the door relay component (54) to show a "door open" configuration. The ECM (80) will, in turn, interpret the corresponding signal sent by the microcomputer (CPU) (20) as a door of the vehicle being open, and will commence a controlled engine shutdown sequence (98) stored in the ECM (80) and begin to apply the vehicle brakes, until a speed of 5 km, or less, is reached at which time the vehicle brakes will engage. During the shutdown sequence, the microcomputer (CPU) (20) will continue to supply the ECM (80) with a "door open" signal, causing the brakes of the vehicle to stay engaged. When the driver leaves the vehicle seat, the microcomputer (CPU) (20) will send a signal (as aforesaid) to the ECM (80) to reactivate the solenoid lock (75).

Other modifications and alterations may be used in the design and manufacture of other embodiments according to the present invention without departing from the spirit and scope of the disclosed invention. For example, the card reader 32 may be readily interchanged with other electronic input devices capable of generating a unique input identification credential for comparison by the microcomputer (CPU) (20) (in conjunction with the access controller (34)) with the database (97), including, without limitation, keypads, key switches, and biometric recognition devices, as will be readily apparent to those skilled in the art. Also, the event log (97) may be sent from the land vehicle to a base location by wireless means other than Wi-Fi, as described above. Such wireless means include, without limitation, GMS radio, satellite signals, etc., as will be readily apparent to those skilled in the art. Furthermore, the optional video data files recorded from cameras onboard the vehicle may be transmitted together with the event log (97), or may be transmitted to a remote base location by separate wireless means.

I claim:

1. A vehicle interlocking system for a land vehicle being susceptible to theft once the land vehicle is left idling in a park mode and readily accessible by an unauthorized driver, and the land vehicle having an engine including an automatic transmission incorporating an interlock device being connected to and controllable by an existing electronic control module (ECM), the interlock device to mechanically lock the driven wheels of the land vehicle when the automatic transmission is placed in the park mode, the vehicle interlocking system, comprising:

a credential input device, said credential input device being mountable on said land vehicle, said credential input device being configured to accept as input a credential from an authorized driver of said land vehicle, the credential being issued to said driver to authorize use of the land vehicle by said driver;

a microcomputer (CPU) being mountable on the land vehicle;

said microcomputer (CPU) and said credential input device being operatively connectable with each other, with said credential input device being configured to transmit said credential received from the authorized driver, and said microcomputer (CPU) being configured to receive said credential from the credential input device;

a credential database stored in said microcomputer (CPU), said credential database containing preloaded credential data for said land vehicle;

said microcomputer (CPU) being configured to make a determination, based on a comparison of said credential and said preloaded credential database, whether said authorized driver is authorized or not authorized to drive said land vehicle;

said microcomputer (CPU) being operatively connectable to said existing electronic control module (ECM); and, said microcomputer (CPU) being configured to operatively interact with said interlock device of the automatic transmission via said existing electronic control module (ECM) to preclude shifting of the automatic transmission out of the park mode of the automatic transmission when said microcomputer (CPU) determines that said unauthorized driver having no credential found in said credential database attempts to engage the automatic transmission from the park mode to non-park modes and to drive said land vehicle while the engine of the land vehicle is left idling in the park mode by the authorized driver, and whereby the chance of theft of said land vehicle by the unauthorized driver while said engine is left idling in the park mode by the authorized driver is reduced.

2. The system of claim 1, further comprising a driver's seat occupancy sensor operatively connected to said microcomputer (CPU), wherein said microcomputer (CPU) is further configured to determine, based on an input from the driver's seat occupancy sensor fitted to said land vehicle, whether a driver is or is not seated in a driver's seat, and said microcomputer (CPU) is further configured to operatively interact with said interlock device to preclude shifting of the transmission out of its park mode when said microcomputer (CPU) determines that a driver is not seated in the driver's seat.

3. The system of claim 2, wherein said microcomputer (CPU) is configured to operatively interact with said interlock device by controlling said input from the brake switch to said existing electronic control module (ECM).

4. The system of claim 3, further comprising a vehicle "door open" sensor and an ECM-controlled shutdown system, wherein said existing electronic control module (ECM) is configured to detect, based on an input from the vehicle "door open" sensor, whether a vehicle's door is open while the vehicle is in motion, and wherein, upon detecting that a door of the vehicle is open while the vehicle is in motion, said existing electronic control module (ECM) is configured to automatically initiate, independent of any action of the driver, a controlled vehicle shutdown and braking sequence to slow down and to bring the land vehicle to a stop.

5. The system of claim 4, further comprising a wireless reception system fitted on said land vehicle, said wireless reception system being configured to receive a remote shutdown command and forwarding said remote shutdown command to the microcomputer (CPU) mounted on said land vehicle, wherein, upon receiving a remote shutdown command, said microcomputer (CPU) is configured to operatively interact with said ECM-controlled shutdown system, by controlling said input from said vehicle "door open" sensor to said existing electronic control module (ECM), so as to initiate, independent of any action of the driver, a controlled vehicle shutdown and braking sequence to slow down and to bring the land vehicle to a stop.

6. The system of claim 5, wherein said wireless reception system is at least one of the following: cellular, radio, infrared, laser, Wi-Fi and satellite communication.

7. The system of claim 1, wherein the microcomputer (CPU) is further configured to store an event log of credentials received from said credential input device and of determinations made by the microcomputer (CPU) as to whether a driver is authorized or not authorized to drive said land vehicle.

8. The system of claim 7, further comprising a first means of wireless data transmission fitted to said land vehicle, wherein said first means of wireless data transmission is configured to transmit said event log from said land vehicle to a remote recipient.

9. The system of claim 8, further comprising a video camera configured for capturing video of an area proximal to said credential input device, wherein said captured video is configured to be stored on-board the land vehicle.

10. The system of claim 9, further comprising a second means of wireless data transmission fitted to said land vehicle, wherein said second means of wireless data transmission is configured to transmit said captured video from said land vehicle to a remote recipient.

11. The system of claim 10, wherein the first means of wireless data transmission and the second means of wireless data transmission are the same means.

12. The system of claim 11, wherein said credential input device is at least one of the following: a keypad, a magnetic card reader, a smart card reader, a radio frequency identification device (RFID) controller, an audio recognition device, a biometric recognition device, and an optical reader.

13. The system of claim 10, wherein said second means of wireless data transmission is at least one of the following: cellular, radio, infrared, laser, Wi-Fi and satellite communication.

14. The system of claim 8, wherein said first means of wireless data transmission is at least one of the following: cellular, radio, infrared, laser, Wi-Fi and satellite communication.

15. A method for preventing an unauthorized driver from operating a land vehicle being susceptible to theft once the land vehicle is left idling in park mode and readily accessible by an unauthorized driver, and the land vehicle having an engine including an automatic transmission incorporating an interlock device being connected to and controllable by an existing electronic control module (ECM), the interlock device to mechanically lock the driven wheels of the land vehicle when the automatic transmission is placed in a park mode, said method comprising:

fitting said land vehicle by operatively connecting a microcomputer (CPU) with the existing electronic control module of said land vehicle;

fitting said land vehicle with a credential input device being configured to accept as an input said credential from said at least one authorized driver of said land vehicle, and the credential being issued to said driver to authorize use of the land vehicle by said driver;

operatively connecting said microcomputer (CPU) and said credential input device with each other, with said credential input device being configured to transmit said credential received from the authorized driver, and said microcomputer (CPU) being configured to receive said credential from said credential input device;

preloading credential data of said one or more authorized drivers for said land vehicle into a credential database stored on said microcomputer (CPU);

allowing said microcomputer (CPU) to make a determination, based on a comparison of said credential and said preloaded credential database, whether said authorized driver is authorized or not authorized to drive said land vehicle; and, allowing said microcomputer (CPU) to operatively interact with said interlock device of the automatic transmission via said existing electronic control module (ECM) to preclude shifting of the automatic transmission out of the park mode of the automatic transmission when said microcomputer (CPU) determines that said unauthorized driver having no credential found in said credential database attempts to engage the automatic transmission from the park mode to non-park modes and to drive said land vehicle while the engine of the land vehicle is left idling in the park mode by an authorized driver, and, whereby the chance of theft of said land vehicle by the unauthorized driver while said engine is left idling in the park mode by the authorized driver is reduced.

16. The method of claim 15, further comprising:

allowing said microcomputer (CPU) to determine, based on an input from a driver's seat occupancy sensor fitted to said land vehicle, whether a driver is or is not seated in a driver's seat; and, allowing said microcomputer (CPU) to operatively interact with said interlock device to preclude shifting of the automatic transmission out of its park mode when said microcomputer (CPU) determines that a driver is not seated in a driver's seat.

17. The method of claim 16, wherein the step of allowing said microcomputer (CPU) to operatively interact with said interlock device to preclude shifting of the transmission out of its park mode comprises allowing said microcomputer (CPU) to control said input from said brake switch to said existing electronic control module (ECM).

18. The method of claim 17, wherein:

said land vehicle has a vehicle "door open" sensor and an ECM-controlled shutdown system, wherein said existing electronic control module (ECM) is configured to detect, based on an input from the vehicle "door open" sensor, whether a door of the land vehicle is open while the land vehicle is in motion, and wherein, upon detecting that a vehicle's door is open while the vehicle is in motion, said existing electronic control module (ECM) is configured to automatically initiate, independent of any action of the driver, a controlled vehicle shutdown and braking sequence to slow down and to bring the land vehicle to a stop;

said land vehicle has a wireless reception system;

the method further including:

allowing said wireless reception system to receive a remote shutdown command;

allowing said wireless reception system to forward said remote shutdown command to said microcomputer (CPU) upon receiving said remote shutdown command; and, allowing said microcomputer (CPU) to operatively interact with said ECM-controlled shutdown system, by controlling the input from said "door open" sensor of said land vehicle to said existing electronic control module (ECM), so as to initiate, independent of any action of the driver, said controlled vehicle shutdown and braking sequence.

19. The method of claim 15, further comprising the step of storing an event log of credentials received from said credential input device and of determinations made by the microcomputer (CPU) as to whether a driver is authorized or not authorized to drive said land vehicle.

20. The method of claim 19, further comprising the step of wirelessly transmitting said event log from said vehicle to a remote recipient via means of wireless data transmission fitted to said land vehicle.

21. The method of claim 19, further comprising the step of capturing video of an area proximal to said credential input device, and storing said captured video on-board the land vehicle.

22. The method of claim 21, further comprising the step of wirelessly transmitting said captured video from said land vehicle.

* * * * *